stamp
UNITED STATES PATENT OFFICE.

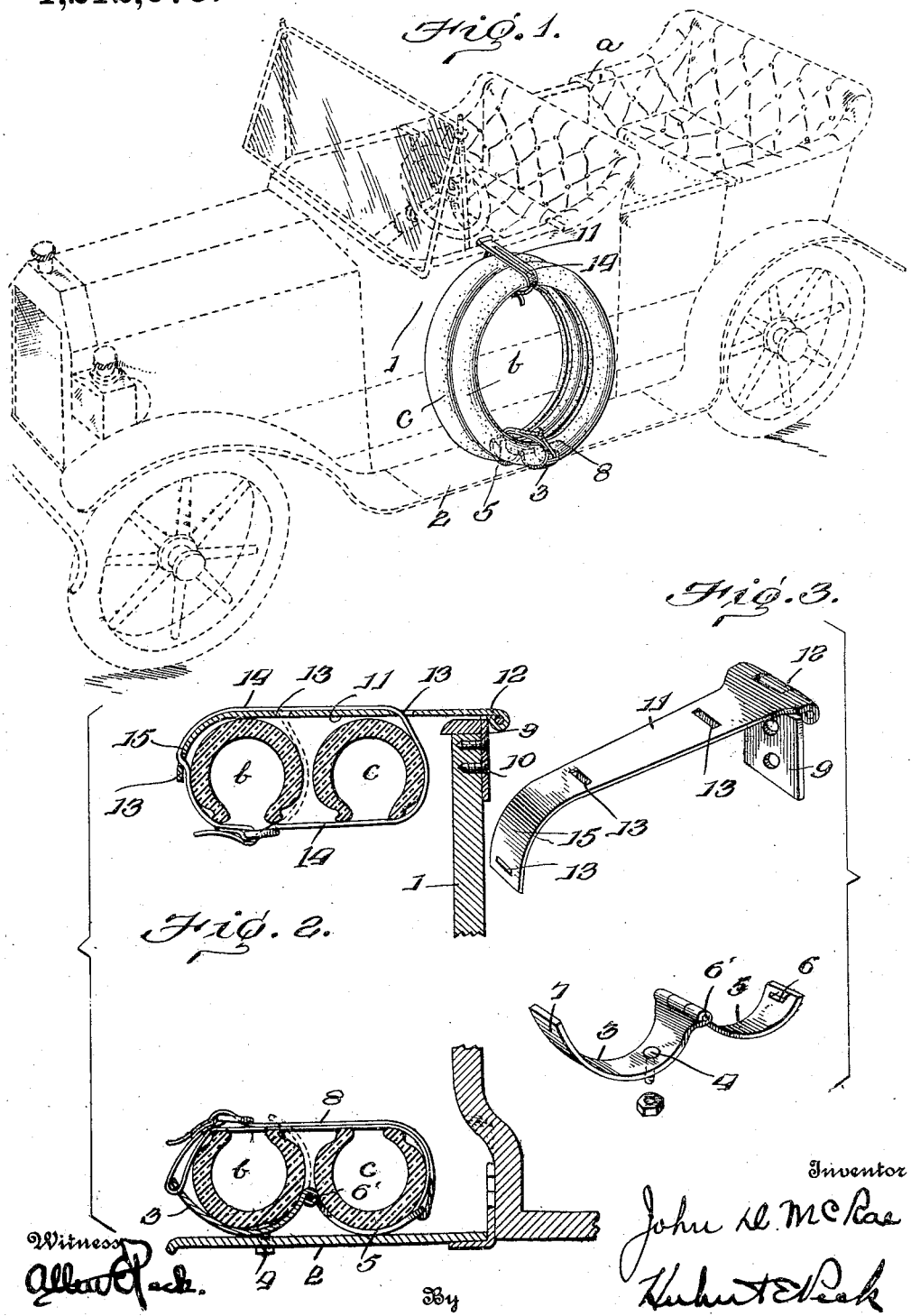

JOHN D. McRAE, OF OSWEGO, NEW YORK.

SPARE-TIRE HOLDER.

1,212,079. Specification of Letters Patent. Patented Jan. 9, 1917.

Application filed February 4, 1916. Serial No. 76,166.

*To all whom it may concern:*

Be it known that I, JOHN D. MCRAE, a citizen of the United States, residing at Oswego, in the county of Oswego and State of New York, have invented certain new and useful Improvements in Spare-Tire Holders, of which the following is a specification.

This invention relates to certain improvements in spare tire holders for motor vehicles; and the objects and nature of the invention will be readily understood by those skilled in the art in the light of the following explanation of the accompanying drawings illustrating what I now believe to be the preferred mechanical expression or embodiment of my invention from among other forms and arrangements within the spirit and scope thereof.

An object of the invention is to provide a simple, durable, and inexpensive tire holder that can be readily applied to automobiles and which will effectively perform the service required of a spare tire holder.

The invention consists in certain novel features in construction and arrangement and in combination of parts as more fully and particularly set forth and described hereinafter.

Referring to the accompanying drawings:—Figure 1, is a perspective view showing an embodiment of my invention applied to a motor vehicle and holding two spare tire casings. Fig. 2, is a vertical sectional view on a larger scale. Fig. 3, is a perspective view of parts of the holder detached from the vehicle, the tire securing straps not being shown.

In the accompanying drawings, I indicate a motor vehicle $a$, the body of which has a vertical usually fixed side wall 1. This vehicle also has a running board 2, on the same side as the wall 1.

The upper member of the tire holder is shown secured to and projecting outwardly from the wall 1, while the lower member of the tire holder is arranged on the running board and immediately below said outwardly projecting upper member.

In the particular example illustrated, although I do not wish to so limit all features of my invention, the lower member consists of a socket composed of a bowed or approximately U-shaped elongated metal strap or plate 3, approximately at the central portion of its convexed under face resting on the running board and clamped thereto by a bolt 4, or other suitable fastening means passing through the running board and central portion of plate 3. This plate 3, is formed to receive a single tire ($b$) and if so desired, a socket for another tire ($c$) can be provided consisting of a bowed or U-shaped elongated metal plate or strap 5, at one end hinged to one end of the plate 3, to swing vertically on a transverse pivot 6', coupling said plates 3 and 5, together. The plate 5, is adapted to rest loosely on the running board in line with the plate 3, and usually arranged between the same and the adjacent side wall of the vehicle body.

The free end of plate 5, and the outer end of plate 3, are preferably provided with transverse strap-receiving slots 6, and 7, respectively, whereby the tire securing strap 8, can be detachably secured to the correspondingly opposite ends of said plates and passed up over the tires resting therein as clearly illustrated by the lower portion of Fig. 2, to detachably secure the lower portions of the tires in said plates.

Where but one spare tire is to be held by the holder, the single tire is placed in the plate 3, and the plate 5, is then swung upwardly and outwardly against the inner side of said tire, as indicated by dotted lines Fig. 2, and the strap 8, is passed over the lower part of the tire and through the ends of the plates to secure the plate 5, tightly against the tire and the tire in place. This lower member of the holder can be quickly and easily secured to the machine, without requiring the services of a mechanic as it is merely necessary to drill a hole through the running board to receive the bolt carried by and depending from the plate 3, and to then apply the nut or tap to the bolt and tighten the same.

The upper member of the holder consists of a vertically swingable arm and a flat metal plate, base or strap 9, having holes for fastening means. This plate 9, is arranged vertically at the inner side of the upper portion of the body side wall and is firmly secured thereagainst by screws 10, or other fastenings, passing through the plate and into said wall. The upper end of plate 9, projects above the level of the horizontal top edge of the vehicle body wall 1. The vertically swingable arm 11, consists of an elongated metal plate or strap at its inner end hinged to the upper end of plate 9, so that the arm can swing vertically on the transverse axis or pin 12 of the hinge. The arm when in normal position extends outwardly approximately horizontally from plate 9, and across the top edge of the wall 1, and over and in the vertical plane of the two bottom socket plates 3, 5, to rest on and across the top edges of the two tires $b$, $c$, resting in said socket plates. The arm is provided with several spaced transverse slots 13 (three are shown) to receive one or more straps 14, by which the tires are detachably lashed or secured to the arm and the arm down on its tires. The free or outer end 15, of the arm is curved or deflected downwardly to fit down at the outer face of the outermost tire and thereby hold the same against outward movement.

When but one tire is in the holder, said tire is arranged at the outer end of the arm against said downturned end and is lashed thereto by one or more straps as indicated by dotted lines, Fig. 2.

In the example illustrated, I show the arm of a length to extend across two tires, but obviously it can be made shorter to receive only one tire, or longer to receive more than two tires.

When the arm is not in use as a tire holder, it can be swung upwardly, inwardly, and downwardly to a vertical position within the vehicle body depending at the inner side of the wall 1, from the base or plate to which said arm is hinged.

The upper member of the holder can be secured to the vehicle body without the assistance of a mechanic as it is merely necessary to drill holes for the screws or bolts to secure the base plate to the inner wall of said wall 1, or to insert wood screws where wood parts are present against which said base plate can be secured in the proper position.

I do not wish to limit the holder involving the swingable arm to use in connection with any particular means for securing the tire or tires to the running board.

It is evident that various changes might be resorted to without departing from the spirit and scope of my invention and hence I do not wish to limit myself to the exact disclosure hereof.

1. A spare tire holder consisting essentially of two plates pivotally joined together, one of said plates adapted to be secured vertically to the inner surface of a vehicle body side wall and the other plate adapted to project outwardly beyond said side wall and over the vehicle running board, said last mentioned plate adapted to receive means for securing a tire thereto.

2. A tire holder comprising one member adapted to be secured to the inner face and vertical wall of the vehicle body and another member hinged thereto and adapted to extend outwardly therefrom over the running board to extend across the tire, and when not in use adapted to be swung upwardly and to hang inside the vehicle body beside the first mentioned member, substantially as described.

3. A tire holder consisting of a plate adapted to be secured in vertical position at the inner side of a vehicle body wall, and an arm hinged thereto and adapted to extend outwardly across the top edge of said wall, the outer end of said arm being deflected downwardly and provided with means for securing a tire thereto.

4. A device for the purposes substantially as described, consisting essentially of a tire holding member and a securing member therefor, said securing member formed to be fastened within a vehicle body and said holding member being connected thereto and adapted to swing from operative position wherein it extends laterally from the body, to inoperative position, wherein it is located within said body.

5. A spare tire holder comprising a tire holding member and a securing member therefor, said tire holding member movably connected to said securing member whereby it may be swung from operative position without a vehicle body to inoperative position to lie within a vehicle body.

In testimony whereof I affix my signature in the presence of two witnesses.

JOHN D. McRAE.

Witnesses:
B. W. BURLEIGH,
JANE MACKAY.

Copies of this patent may be obtained for five cents each, by addressing the "Commissioner of Patents, Washington, D. C."